Nov. 4, 1947.     H. BROWNING     2,430,273
TOOL FOR LINING PIPE
Filed Nov. 14, 1945
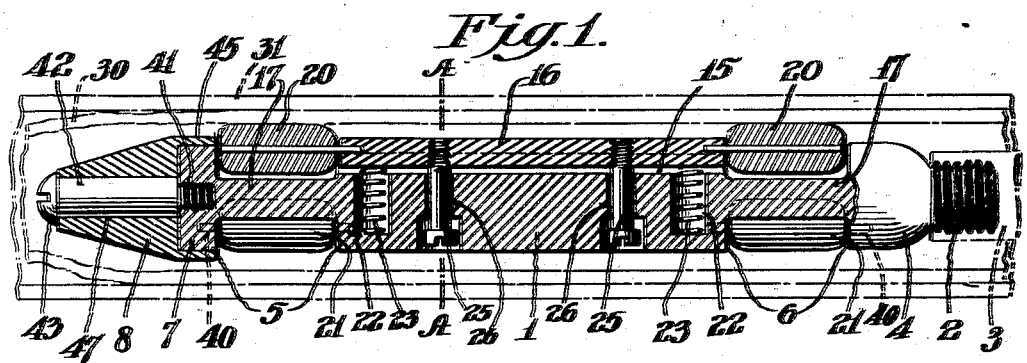
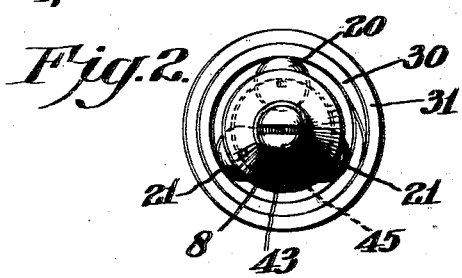
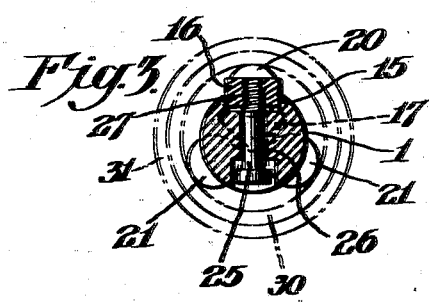
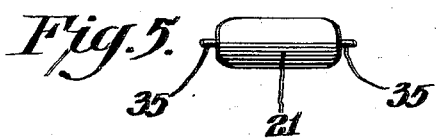
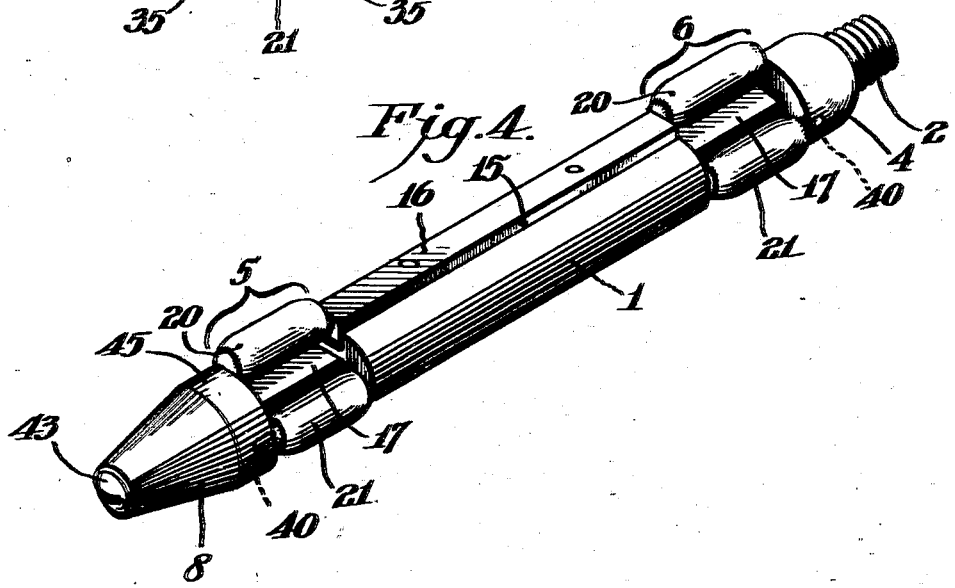
INVENTOR.
HARRY BROWNING
BY
Walter C. Wheeler
ATTORNEY Patented Nov. 4, 1947

2,430,273

UNITED STATES PATENT OFFICE 2,430,273

TOOL FOR LINING PIPE

Harry Browning, Louisville, Ky., assignor to E. I. du Pont de Nemours & Company, Wilmington, Del., a corporation of Delaware Application November 14, 1945, Serial No. 628,547

2 Claims. (Cl. 154—41)

This invention relates to improvements in devices suitable for use in making linings of plastic material for apparatus such as pipes and cylindrical containers.

In the lining of apparatus, such as tanks, with plastic material or rubber and the like, the walls of the apparatus are coated with a cement and sheets of unvulcanized rubber are applied to the walls. The sheet material is then rolled for eliminating air spaces and irregularities in the sheet, and then the edges of the sheets are joined. Finally the apparatus is heated for vulcanizing the rubber. This method of applying the coating material has not been followed for lining cylindrical pipes of small sizes where space limitations do not permit the use of hand operated rollers. In one method for lining pipes the uncured lining material, such as unvulcanized rubber in the form of a hollow cylinder, is inserted in the pipe and then the lining is expanded into contact with the inner wall of the pipe by the action of compressed air during the vulcanization of the rubber. This procedure is not satisfactory in that the air sometimes forms pockets between the lining and the tube and the pockets are not always eliminated. Any air initially entrapped between the lining and the tube expands when heated and enlarges the pocket. Any leakage of air through the tubular lining during vulcanization forms new air spaces or enlarges those already formed and the lining does not become as firmly bonded to the wall as a mechanically worked lining.

In another method of lining pipe to which the present invention relates, a sheet of lining material which is cut so as to cover the inside of the pipe with considerable overlapping and curved generally in the form of a tube is drawn into the pipe to be lined, the pipe having been previously coated on the inside with a suitable adhesive. The lining material is next rolled into contact with the inside wall of the pipe by means of a device which is provided with rollers which press the uncured lining radially outwardly whilst rolling it into a tubular lining and pressing out air bubbles between the pipe and lining. For this method of lining a suitable tool has been provided for lining the larger sizes of pipe, but for smaller sizes of pipe, such as two inch diameter pipe and smaller pipes, it has not been found possible to satisfactorily fabricate that tool for use in pipes as small as, or smaller than about two inches in diameter.

It is among the objects of the present invention to provide a device which is convenient for the lining of pipe with plastic material, and especially a device which is particularly useful for lining pipes of relatively small size. Another object of the invention is to avoid difficulties heretofore encountered in making such linings. The foregoing and other objects will be apparent from the following description in which the principle, embodiment and method of putting the invention into effect are set forth and illustrated with reference to the drawing in which Figure 1 is a view partially in elevation and partially in cross-section of the tool for lining pipe in operative position in a pipe, the cross section being in a longitudinal plane passing through the axis of the tool and the axis of a radially movable shaft, Figure 2 is an end view showing the leading end of the tool, Figure 3 is a cross-sectional view taken along the line A—A of Figure 1, Figure 4 is a perspective view of the tool, and Figure 5 is a side elevational view of a fixed roller.

The objects of the invention are attained by providing improvements in a device which comprises a system of rollers which is supported upon and around a central support or shaft. The system is arranged to expand against the lining material 30 for mechanically compressing and working it into contact with the cylinder 31 to be lined. Improvements in the device of this general description comprises a tapering rotatable end piece mounted on the leading end of the support and an arrangement for carrying the rollers whereby the position of some of the pairs of rollers is fixed with respect to the axis of the central rotatable shaft or support while other pairs of rollers are mounted on a floating shaft which is carried by the support. In the lining of relatively small pipes, such as pipes of about two inches and less in diameter, it was found that more than one floating roller did not work satisfactorily for one or another reason, and it was further found that when working with such small clearances a tool with special features was necessary in order to attain satisfactory results.

Referring to Figure 1, the tool comprises the main central rotatable shaft or support 1 which is desirably cylindrical in shape. The support is desirably reduced and threaded at the inner end 2 for mounting it on the end of a driven shaft 3. The outer end portion 4 of the support inside of the threaded part 2 is desirably reduced on a taper so as to provide a gradual decrease in diameter from the largest diameter of the support to the reduced and threaded end portion for providing a gradually enlarging diameter from the driving shaft 3 so that sharp cutting edges will not be presented to the lining when the tool is withdrawn from a lined pipe. The support is provided with two circumferential grooves 5 and 6 spaced from, but near its ends, for providing spaces in which to mount rollers. The grooves are spaced from the ends sufficiently to provide for a ring partition and tapered part 4 at the inner end and provision for forming a thrust bearing 7 and a tapered rotatable mounting 8 at the leading end.

The main cylindrical body 1 of the support is provided with a longitudinal groove 15 having walls which are parallel to each other and to the axis of the support. The longitudinal groove extends between the circumferential grooves 5 and 6 and its walls are located so that a floating shaft 16 can be mounted in the groove for radial movement toward and from the axis of the support. The longitudinal groove 15 and end transverse grooves 5 and 6 are desirably machined to a depth of about one-third the diameter of the support 1 so as to leave spindle portions 17 between the main longitudinally grooved central portion 1 of the support and the inner and outer shoulders 4 and 7, thus providing ample space in which to mount the contact rollers 20 and 21 in the grooves 5 and 6.

At the bottom of the longitudinal groove 15 two wells 22 are bored equi-distantly from the ends of the grooves for mounting coil springs 23 for floating the shaft 16 and contact rollers 20 and for maintaining the shaft 16 in outer radial positions. The axes of the shaft and rollers are held in parallelism with the axis of the support by equalizing the yieldability of the springs. The shaft 16 is mounted on the support by set screws 25 which pass through the support 1 in sliding engagement in the bores 26. At their outer ends the bores are enlarged to fit the enlarged heads of the set screws 25 and to provide shoulders or abutments to stop the radial travel of the shaft. The corresponding bore in the shaft 16 is threaded for the set screws 25 and the set screws are proportioned so that the shaft will be biased against the springs when the set screws are in place. Rollers 20 are mounted on stub shafts at both ends of the floating shaft 16 so that they will turn in the transverse grooves 5 and 6 while the shaft is in all radial positions of its travel.

The other rollers 21 of which there may conveniently be two pairs, are positioned equi-angularly with respect to each other and the above described set of radially movable rollers 20. These other or fixed rollers 21 are on fixed axes which are parallel to the axis of the support. The fixed rollers 21 have stub shafts 35 at both ends. In mounting them at the outer end of the tool, the stub shaft 35 at one end of the roller is entered into a journal bored at the end of the central enlarged part 1 of the support; then, the other end is entered in a slot 40 in the wall 4 at the inner end and the part 7 at the leading end. The slots 40 are rounded at the bottom to form bearings for the stub shaft 35. In lieu of battering the edges of the slots for retaining the rollers, an inset fitted to the slot and stub shaft can be entered in the slot and held therein by a suitable key member or screw.

At the leading end of the support a thrust bearing 7 is formed and a tapped hole 41 is provided to enter a set screw 42 for mounting the tapered rotatable end member 8. The rotatable end member 8 is tapered with its small end in a leading position and its large circular end enlarged to about the diameter of the central portion of support 1 but somewhat smaller than the diameter of the cylinder whose elements are co-extensive with the elements of the fixed rollers 21. The leading and following edges of rollers 20 and 21 are rounded to provide a gradual enlargement of the diameter of the tool at the leading end from the tip to the cylindrical surfaces of the fixed rollers 21 and at the following end from the shoulder member 4 for preventing cutting of the lining when the tool is propelled in either direction. A skirting portion 45 of the end member 8 is formed at the enlarged end by countersinking and forming a thrust bearing to fit the formed end portion 7 of the support. The tapered end member 8 is given a smooth bore and the set screw 42 having an enlarged stem portion which operates as a bearing upon which the end member 8 rotates, a threaded portion to screw into the threaded bore in the end of the support and an enlarged head 43 to retain the rotatable tapering end member, serves to mount the tapering end member 8 in place.

In the operation of lining a pipe with rubber, the pipe, having been covered with rubber cement and a sheet of unvulcanized rubber having been cut and formed in the general form of a tube with its edges overlapping, is drawn into the cemented tube. In small sized pipe it is difficult to dispose the sheeted rubber in very close contact with the pipe, but, upon entering and turning the tool, the leading rotatable end member 8 gradually works the sheeted material toward the walls and forms a loosely disposed lining on the tube which is fairly smooth and without wrinkles in the parts traversed by the rotatable end member, so that when the tool is progressively advanced further with turning the pressure rollers 20 and 21 with their rounded or filleted leading edges readily roll out the plastic material into a lining which is devoid of any air spaces between the lining and tube. Upon first entering the tool into the tube the floating shaft 16 with its rollers 20 is depressed manually to provide for entering the rollers 20 and 21. Having once started to roll out the lining, the rollers 20 on the floating shaft and the fixed rollers 21 will work the lining into place and remove all air pockets as the tool is rotated and slowly advanced through the pipe. After the uncured lining is smoothed out inside of the pipe it is cured in the usual manner, as by heat treatment.

The device may be revolved by a hand crank attached to the shaft 3 or the shaft 3 may be power driven. Different speeds of revolution will be found to be desirable for making different kinds of linings. For working a lining of unvulcanized rubber in a pipe which is 2 inches in diameter, a speed of rotation of about 60 revolutions per minute with a lineal rate of advance through the pipe of about 72 inches per minute is generally sufficient working to produce a satisfactory continuous integral coating of unvulcanized rubber or rubber-like material of substantially uniform thickness, but these rates of rotation and advance may be varied to suit the characteristics of the lining material to be installed and variations in the strength of the springs 23.

If desired, the shaft 2 may be attached at its outer end to a device for advancing the rollers at a regular rate, such as a worm drive (not shown). It is desirable to provide means for rotating and advancing the head and shaft of the tool through the tube when a large number of units are to be lined, but any means for rotating the head and advancing it linearly through the tube may be used.

The rollers 20 and 21 are provided with cylindrical surfaces of more or less length depending upon the type of manipulation needed to work the lining material, and the rollers are rounded at least at their leading edges so that they will not gouge the lining material, especially before it is worked into contact with the inside surface of the pipe. A rounded edge of considerable radius is desirable at least on the leading edges of the rollers so that all up-struck seams and roughness in the lining material will be gradually worked into a layer of smooth inner contour. The details of construction can be modified in numerous ways to suit the characteristics of material which is used for making the lining.

From the foregoing disclosure it will be recognized that the invention is susceptible of modification without departing from the spirit and scope thereof and it is to be understood that the invention is not restricted to the specific illustrations thereof herein set forth.

I claim:

1. A tool for lining pipes which comprises a main rotatable support having mounted thereon a plurality of rotatable rollers, a non-rotatable floating shaft mounted for radial movement and parallel with the axis of said support, rotatable rollers at both ends of the non-rotatable shaft for bearing outwardly upon lining material to be mounted in the pipes, pins on said non-rotatable shaft mounted radially in sliding engagement in openings in said support, and spring means between the support and the shaft for floating the non-rotatable shaft and maintaining all the rollers in bearing engagement with the lining material; an end member rotatably mounted on the leading end of the support, said end member having a tapered portion which is smaller in diameter at its leading end and gradually increases in diameter toward its other end to a diameter smaller than the extreme diameter of the surface described by the rollers on rotation of the support, said end member comprising a cylindrical portion adjoining the larger end of said tapering portion and having the diameter thereof, an end bearing formed at the leading end of the support, and a thrust bearing within said cylindrical portion of said rotatable end member for engaging said end bearing, and means for rotatably mounting the end member on the outer end of the support.

2. A device in accordance with claim 1 in which the rollers at the ends of the floating shaft are disposed in annular grooves in the support, the non-rotatable shaft having parallel flattened sides extending between the rollers, said support being provided with a longitudinal groove having parallel surfaces for engaging the flattened sides of the non-rotatable shaft in radial sliding engagement, each of said longitudinal and annular grooves extending only partly through the support but extending a sufficient depth to permit radial movement of the rollers and non-rotatable shaft.

HARRY BROWNING.

REFERENCES CITED

The following references are of record in the file of this patent:

UNITED STATES PATENTS

| Number | Name | Date |
| --- | --- | --- |
| 2,395,450 | Browning | Feb. 26, 1946 |
| 2,353,951 | Wood et al. | July 18, 1944 |
| 459,950 | Harrington | Jan. 17, 1893 |